Nov. 25, 1952  L. S. WILCOXSON  2,619,411
APPARATUS FOR RECOVERY OF CHEMICALS AND
HEAT FROM RESIDUAL LIQUOR
Filed Sept. 29, 1948  2 SHEETS—SHEET 1

INVENTOR
Leslie S. Wilcoxson
BY
ATTORNEY

Nov. 25, 1952     L. S. WILCOXSON     2,619,411
APPARATUS FOR RECOVERY OF CHEMICALS AND
HEAT FROM RESIDUAL LIQUOR
Filed Sept. 29, 1948     2 SHEETS—SHEET 2

INVENTOR
Leslie S. Wilcoxson
BY
ATTORNEY

Patented Nov. 25, 1952

2,619,411

UNITED STATES PATENT OFFICE 2,619,411

APPARATUS FOR THE RECOVERY OF CHEMICALS AND HEAT FROM RESIDUAL LIQUOR

Leslie S. Wilcoxson, Ridgewood, N. J., assignor to The Babcock & Wilcox Company, New York, N. Y., a corporation of New Jersey Application September 29, 1948, Serial No. 51,806

6 Claims. (Cl. 23—262)

1

The present invention relates in general to the recovery of chemicals and heat from the incineration of residual liquor resulting from the digestion of cellulosic fibrous material in the acid or sulphite wood pulping process, and particularly to the incineration of a residual liquor containing a relatively pure magnesium base sulphite cooking liquor. More specifically, the present invention is an improvement in the incinerating apparatus disclosed in my U. S. patent, No. 2,354,175.

The inorganic chemicals used for cooking and contained in the residual liquor obtained in a cellulosic pulping process utilizing a relatively pure magnesium base cooking liquor can be recovered in a usable state by the incineration of the liquor. Such a process and the apparatus therefore is disclosed in my previously mentioned patent. As disclosed in the patent, the residual liquor can be incinerated under controlled combustion conditions to yield an economical recovery of readily usable chemicals along with the generation of usable heat. The noncombustible magnesium compounds are recovered in a dry condition, primarily in the form of magnesium oxide, while the sulphur content is recovered in the form of sulphur dioxide. The combustible constituents of the liquor are consumed with the gaseous products of combustion releasing their heat to generate steam by absorption in a suitable heat exchanger. For the recovery of the inorganic chemicals in a usable form the combustion process must be closely controlled to effect an optimum temperature-time relationship with a regulated furnace atmosphere. To accomplish this the residual liquor is burned in suspension and the gas flow velocities through the furnace must be such as to avoid a deposition of any of the chemical solids within the higher temperature zones of the combustion chamber or the heat recovery unit. This is accomplished by admitting measured quantities of combustion air at spaced positions sequentially of the gas flow path and by providing a cross-sectional gas flow area in the apparatus, through which the gases pass, such as to insure adequate gas flow velocities. Advantageously the gases while undergoing combustion are all directed through a confined flow path of predetermined length, so that gas by-passing will not occur, with its attendant danger of over or under burning some of the inorganic chemicals in the residual liquor.

The general object of my invention is the provision of an improved means for burning a residual liquor with an efficient recovery of dry chemicals, sulphur dioxide and heat therefrom.

2

A further and more specific object is the provision of apparatus for the continuous suspension burning of a magnesium base residual liquor under controlled conditions of temperature and atmosphere for the recovery of chemicals in a dry state and for the absorption of heat in an associated vapor generator. A further specific object is to provide apparatus for the ignition and partial combustion of a magnesium base residual liquor in suspension under a reducing furnace atmosphere, to introduce additional combustion air to the burning stream at sequential points in its flow path so as to maintain the solids in suspension and to regulate the temperature of the burning stream in its passage through the apparatus, whereby the oxidation of the inorganic constituents is completed. An additional specific object is the provision of a furnace and an associated heat recovery unit arranged for the suspension burning of residual liquor under controlled conditions whereby the inorganic chemical constituents of the residual liquor are recovered in a dry state and the combustible organic constituents are burned to oxidize the inorganic chemicals and to generate heat for absorption by the heat recovery unit.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a practical embodiment of my invention.

Figure 1:
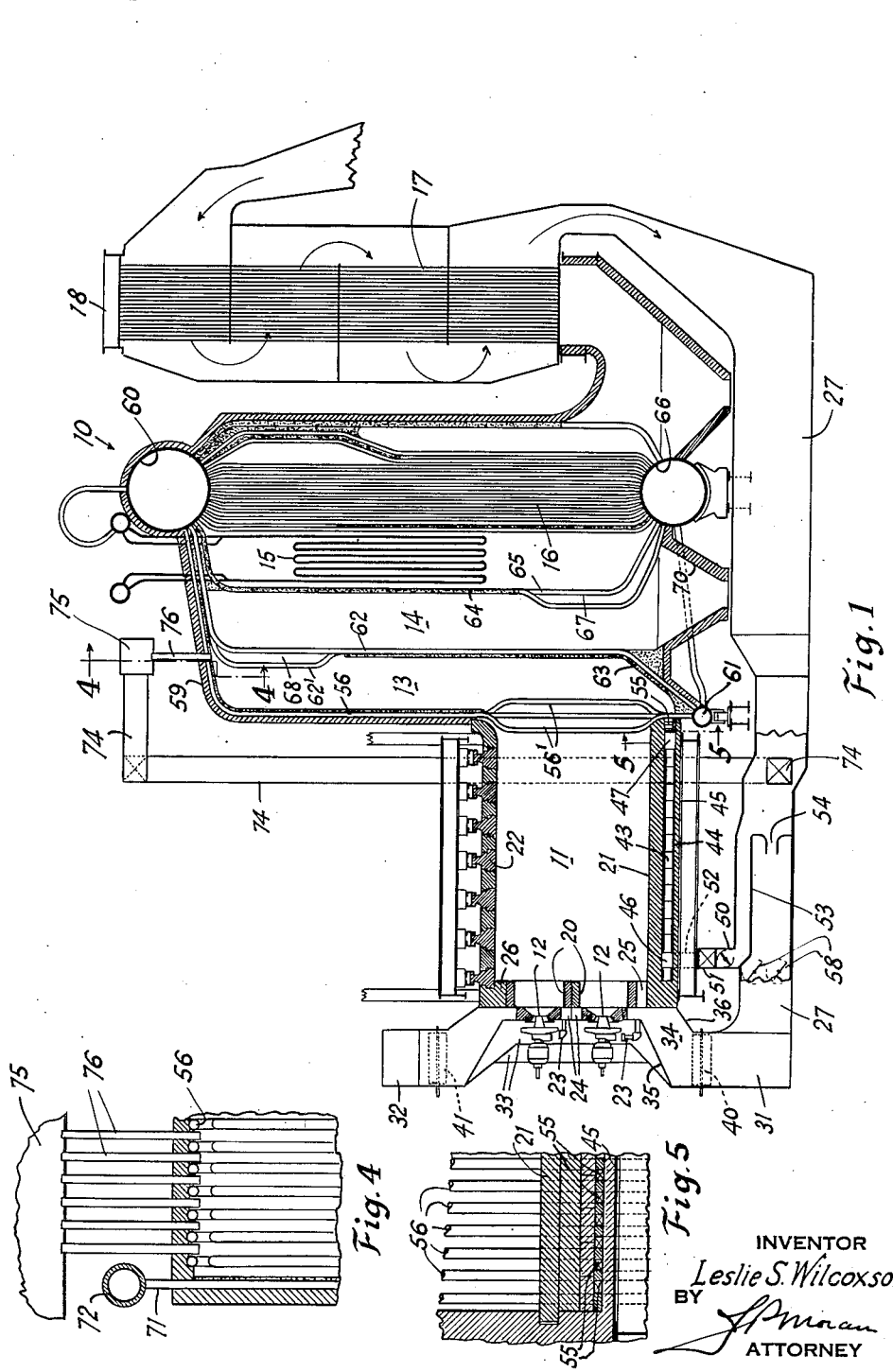
Fig. 1 is an elevation view, partly in section of a furnace and vapor generating unit constructed in accordance with the present invention.

Figs. 4 and 5 are sections taken on lines 4—4 and 5—5, respectively, of Fig. 1.

The invention comprises a multiple zone combustion space having a horizontally extending refractory primary furnace 11 followed by vertically elongated water cooled wall zones associated with a steam generator 10 and chemical recovery apparatus (not shown). The primary furnace chamber 11 is arranged for the suspension burning of a residual liquor which is delivered thereto as a horizontally projected spray from a plurality of burners 12 arranged in the end wall of the primary furnace. The primary furnace discharges the gases and entrained solids from the end opposite the burners to the lower end of a second furnace zone 13, which extends upwardly and connects at its upper end to a subsequent down-flow furnace zone 14.

A portion of the air used in the combustion of the constituents of the liquor is supplied to the primary furnace in embracing and mixing relationship to the spray delivered by the burners, while the remainder is introduced at spaced positions in the primary and subsequent furnace zones for accomplishing additional operative results. The products of combustion, upon leaving the lower end of the gas pass zone 14, enter the heat and chemical dust recovery apparatus, first passing over the steam superheater 15, followed by the boiler convection surface 16 and through the tubular air heater 17. On leaving the air heater the gases with entrained chemical dust particles are passed through suitable dust collecting and gas absorption devices, as described in my previously mentioned patent, to separate and recover the chemical constituents.

The major portion of the air used in the combustion and oxidation process is delivered by a forced draft fan (not shown) to the air heater 17 and after being preheated therein flows to the burners 12 and other air introduction ports into the combustion zones, as hereinafter described.

Figure 2:
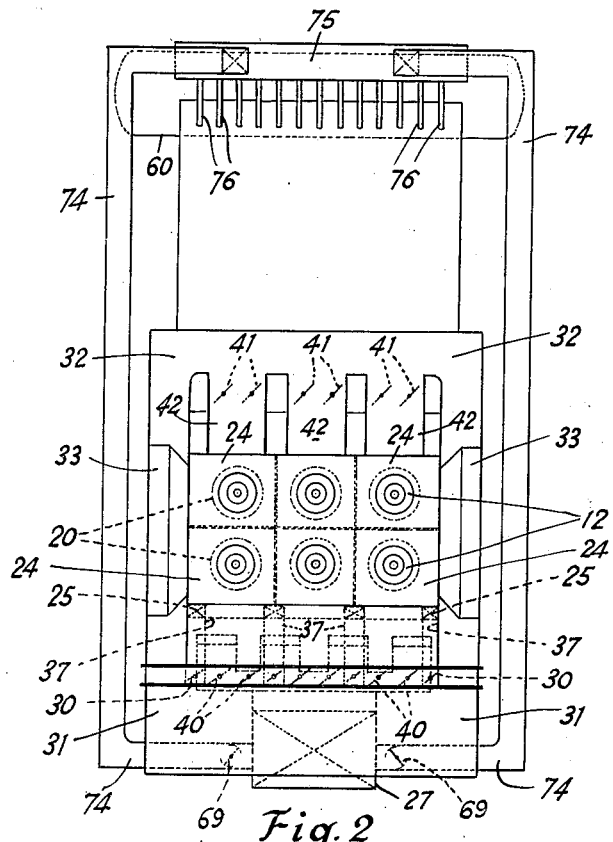
Fig. 2 is an end elevation of the apparatus viewed from the left in Fig. 1.
Figure 3:
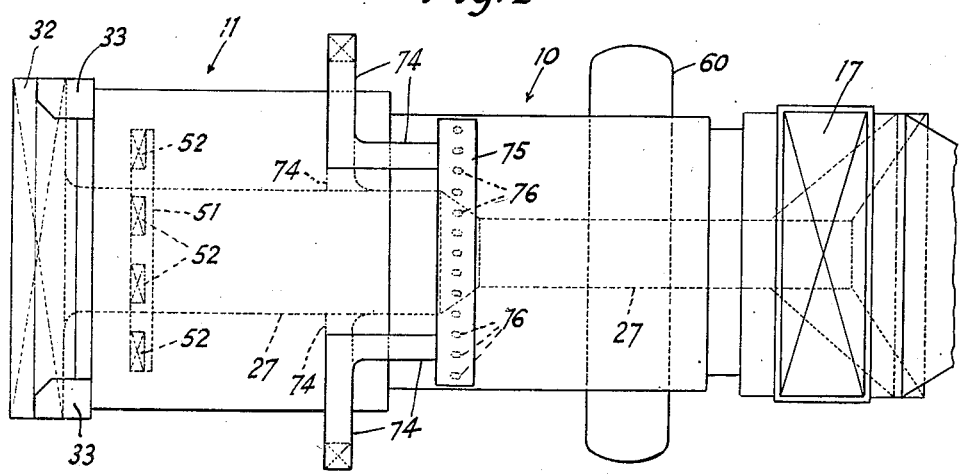
Fig. 3 is a plan view.

As shown in Figs. 1, 2 and 3, the primary furnace walls are constructed of refractory material defining a combustion chamber of rectangular vertical and horizontal cross-section. One end of the furnace 11 is provided with a group of six burner ports 20 arranged to receive the burners 12, while the opposite end opens into the lower end of the furnace zone 13 of the steam generator. The furnace floor 21 is hollow, as hereinafter described, while the roof 22 is of a suspended arch type. Experience has shown that a high alumina brick will best withstand the service conditions encountered in such a chemical furnace, so that all primary furnace surfaces exposed to the action of the flame are formed of this material.

Air for combustion is preheated to a temperature of approximately 600° F. in the air heater 17 by indirect heat exchange with the gases leaving the steam generator 10. This preheated air is discharged from the air heater under a positive pressure into an air duct 27 which extends longitudinally beneath the generator and furnace to a position adjacent the front or burner wall 26 of the primary furnace. The duct 27 discharges the air into a lower transverse air manifold duct 31 which extends across the width of the furnace. A second transverse air manifold duct 32 extends across the front wall of the furnace at the general elevation of the roof 22. The headers 31 and 32 are connected by vertical conduits 33 positioned on opposite sides of the furnace front wall 26. Between the facing surfaces of the vertical conduits 33, the upper portion of the header 31 opens to a conduit 34 defined on top and bottom by the spaced plates 35 and 36, respectively. The bottom plate 36 extends to an air-tight connection with the outer surface of the furnace wall 26, while the top plate 35 extends to the furnace wall at longitudinally spaced positions with intermediate longitudinal portions extending to the lower edge of individual air housings 24 separately enclosing each of the lower row of burners 12. Longitudinally extending vertical division plates 37 separate the conduit 34 into a plurality of passageways for directing air to each of the housings 24 and to each of a group of four openings 25 in the wall 26 directly adjacent the surface of the floor 21. The air flow to each of the housings 24 enclosing the lower row of burners 12 is regulated by a pair of valves 40, so that the amount of air passed through each of the ports 20 may be controlled in accordance with the liquor delivered by each burner. The air flow to each of the openings 25 is regulated by the valves 36, which may be mechanically connected for gang operation to coordinate air flow with the amount of liquor sprayed into the furnace. The air supply to the upper row of burners 12 is controlled in a similar manner by the pairs of valves 41 positioned in individual ducts 42 connecting the upper manifold 32 with each of the upper row of housings 24.

The burners 12 are of a known rotary cup type, each driven by an electric motor and having an integral blower in the burner assembly for the admission of some air through the burner with the sprayed liquor. Advantageously the air introduced through the burner with the sprayed liquor is preheated. Since the air inlet to the burner is positioned between the driving motor and the blower rotor, the temperature of the air must be limited to avoid interferring with the operations of the motor and the rotor bearings. To attain the desired burner air temperature a controlled quantity of high temperature air from each of the housings 24 is tempered with room air upon delivery to the integral blower of the burner. This is accomplished by the use of a valved pipe 23 which is arranged to direct a flow of preheated air from each housing 24 to the burner blower inlet. To temper this air, the end of the pipe 23 is spaced from the blower inlet and provided with an orifice so that the controlled jet of preheated air will mix with ambient temperature air drawn into the burner blower inlet.

As shown particularly in Fig. 1, the hollow floor 21 is constructed with an upper surface of refractory material supported by rows of hollow tile 43 and a lower layer of insulating material 44 resting upon a bottom metallic plate 45. The hollow tiles 43 are arranged in rows forming a series of longitudinal air flow paths, with the tile in each row longitudinally spaced adjacent opposite ends of the furnace to provide plenum chambers 46 and 47 adjacent the front wall 26 and the gas outlet end of the furnace 11, respectively. A controlled flow of air is delivered to the plenum chamber 46 from the duct 27 through a valved off-take pipe 50, a transversely positioned distributing main 51 and four horizontally spaced, vertical conduits 52. To insure a controllable flow of air to the hollow floor 21, a transversely disposed plate 53 is extended from side to side of the duct 27, at an elevation spaced below the top thereof. In effect the plate 53 divides the cross-sectional area of the duct 27, with the upper portion in communication with the plenum chamber 46 while the lower portion leads to the manifold duct 31. A restriction, in the form of a Venturi-like opening 54, is positioned in the duct 27 below the plate 53, and combines with air valves 56 to proportion air flow to the manifold duct 31 and the hollow floor 21.

The air passing through the hollow tile of the floor 21 is heated thereby and is discharged through a plurality of transversely spaced ports 55, positioned beneath the gas discharge end of the furnace 11 into the furnace zone 13. This construction is shown in Figs. 1 and 5, wherein the ports 55 are surrounded by refractory material having a horizontal dimension substantially equal to the intertube spaces between the tubes defining a wall of the zone 13, as hereinafter described, and a vertical dimension approximately ¼ the height of the hollow tiles 43. The combined effect of the hollow tile floor construction and the ports 55, tends to distribute the air so that each port 55 will discharge a substantially equal flow of air into the furnace zone 13.

The furnace zones 13 and 14 are defined by tube and refractory walls, where the tubes are connected into the circulatory system of the generator 10. The tubes of the outer wall 57 of the vertical gas pass furnace zone 13 are uniformly spaced in a tube row 56 with their upper ends opening into the upper drum 60 of the generator 10 and their lower ends opening into a transverse lower header 61. As shown, the header 61 is spaced beneath the lower edge of the primary furnace 11 outlet so that the row 56 of vertical tubes are closely adjacent the furnace, and enter the header in alignment with the longitudinal axis of the header. In the vicinity of the primary furnace outlet, alternate tubes 56' are alternately bent in opposite directions out of the plane of the vertical row 56 of tubes to form three parallel rows providing adequate area for the flow of gases therebetween. At the upper end of the gas-pass the tubes incline toward the drum 60 to form the roof 59 of the zone 13, and cooperate with the upper portions of a second row of tubes 62 to form the roof of the zone 14.

The second row 62 of tubes is arranged parallel to the tube row 56 through a substantial portion of its vertical extent, and open to the drum 60 at their upper ends. The lower ends of the tubes open to the header 61 with their lower end portions bent to an angle of approximately 30° out of the vertical plane. The 30° slope forms an inclined lower wall 63 at the bottom of the first gas-pass zone 13 which cooperates with the combustion air admitted from the ports 55 of the hollow furnace floor 21 to give an upward impetus to the ash-laden gaseous mass entering the furnace zone. The upper vertical end portions of alternate tubes 62' in the row 62 are bent forwardly out of the vertical plane to proving an opening 63, between the zones 13 and 14, for gas flow therebetween. Refractory material seals the intertube spaces in the rows 56 and 62 (except at the primary furnace outlet and the opening 68) and also covers the tube surfaces defining the relatively high temperature zone 13. The tube sides of the row 62 defining one side of the zone 14 are, however, bare, for increased cooling effect on the gases passing thereover.

The rearward wall 64 of the zone 14 is formed by a substantially vertical row 65 of spaced tubes which are provided with refractory material therebetween in their upper end portion, with bare tube surfaces facing the zone 14. These tubes open into the upper drum 60 at their upper ends and open into a lower drum 66 at their lower ends. An opening 67 is provided in the lower end portion of the wall 64 with the gases thereafter passing upwardly through the superheater 15 and through the convection banks 16 of the steam generator. Ash hoppers 70 and 73 are provided at the bottom of the second gas-pass 14 and between the bank 16 and air heater 17, respectively, for the collection of any dry ash separated from the partially cooled combustion gases.

The side walls of the gas-passes, and the generator 10, are also fluid cooled by fluid flow through refractory covered side wall tubes 71 (see Fig. 4). These tubes are connected in the conventional manner to an upper header 72 at their upper ends and to a longitudinally horizontally disposed side wall header (not shown) on each side of the unit, at their lower ends. The headers 72, as well as the lower side wall headers are connected into the fluid circulatory system of the steam generator in the conventional manner.

In addition to the combustion air added to the burning gas stream leaving the primary furnace and entering the lower end of the gas-pass furnace zone 13, further combustion air is added at the upper end of the zone 13 to pass with the burning gaseous stream into the zone 14. An air conduit 74 is attached on each opposite side of the duct 27 adjacent to, but on the upstream side of, the restriction 54. Each conduit is provided with a valve 69 to regulate flow of air therethrough, and extends horizontally, in a direction normal to the duct 27 a distance sufficient to clear the outer walls of the primary furnace 11. Thereafter each conduit 74 is vertically extended to a position above the roof of the steam generator 10 and horizontally extended to enter a transverse horizontal air manifold 75 spaced above the tubes 56. Each manifold 75 projects from the longitudinal centerline of the steam generator to the outer wall thereof. A vertical row 76 of air injection nozzle tubes direct a flow of combustion air from the manifold 75 downwardly between the tubes 56 in the roof of the zone 13 to intersect the burning gas stream as it flows from the first to the second gas-pass 14.

In operation, the liquor to be burned is delivered to each of the burners 12, from which it is projected in a conically shaped spray. The axis of each spray cone is substantially horizontal and as the liquor spray combines with the embracing stream of combustion air, the mixture burns in moving toward the primary furnace outlet. Within the primary furnace 11 a reducing flame is maintained with a major portion of the total air introduced through and around the burners 12 from the housings 21 and through the openings 25. The horizontally directed entrance velocity of the air passing through the openings 25 cause it to sweep rearwardly over the floor 21, minimizing the depositions of noncombustible particles on the primary furnace floor. The openings 25 are positioned adjacent the primary furnace side walls and between the burners 12 so that the effect of the high velocity air streams therefor is in the zone where it is most needed. Ordinarily, the temperature within the refractory lined primary furnace 11 will be of the order of 2200 to 2300 F. which is substantially below the temperature at which any melting of magnesium oxide might occur. Maintaining this relatively high furnace temperature will permit the suspension burning of a majority of the carbon containing organic constituents of the liquor, while the reducing atmosphere will permit the separation of the magnesium-sulphur compounds into magnesia (MgO) and sulphur dioxide ($SO_2$). With high gas flow velocities through the furnace 11, the residence time of the suspended solid particles in the burning stream will be insufficient to "dead burn" the magnesia to a non-reactive state.

Upon leaving the furnace 11, the stream of the gaseous mixture will continue burning with the incombustible particles suspended therein. In turning for an upward flow through the zone 13 of the furnace 10, additional preheated combustion or secondary air, discharged from the hollow floor of the furnace, not only tends to sweep the floor 63 of the gas-pass 13 clear of any solid particles, but will also mix with the burning gaseous stream. This additional air will tend to increase the temperature of the burning gaseous stream, but with the refractory covered fluid cooled walls defining the zone 13, heat is absorbed at a rate sufficient to avoid a temperature increase of the burning stream. The secondary air supplies oxygen to continue the combustion of the carbon remaining in the gaseous stream, while the air, at the temperature prevailing in zone 13, is insufficient to convert the suspended magnesia to magnesium carbonate.

In a similar manner, preheated air is added at the entrance to the zone 14 in an amount sufficient to complete the combustion of the carbon remaining in the gaseous stream but to retain the magnesia and sulphur dioxide in those forms. The jets of tertiary air added through the nozzle 76 mixes with the gaseous stream in passing at an increased velocity through the upper spaced portions of the tubes 62 in the entrance 68. The combined effect of the tertiary air and the cooling walls of the zone 14 reduce the temperature of the gaseous stream so that the sulphur dioxide will not be converted to sulphur trioxide with the increased oxygen content of the gaseous stream.

Thus in the described operation of the apparatus of the present invention a residual liquor is incinerated under controlled temperature and furnace atmosphere conditions for the recovery of an incombustible residue in a dry, chemically reactive state, with an accompanying recovery of the heat formed during the incineration. Actually the apparatus is operated primarily as a chemical process with the recovery of heat in the nature of a secondary, but valuable, result of the chemical recovery process.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What I claim is:

1. Apparatus for the recovery of chemicals in a dry state and heat from residual liquor containing inorganic chemicals and organic combustible matter comprising, in combination, a horizontally elongated primary furnace chamber having an outlet at one end thereof, said furnace lined by alumina firebrick and having a hollow floor, at least one burner arranged to spray said liquor substantially horizontally into said furnace chamber, a vapor generator, rows of vapor generating tubes and refractory material cooperating to define a pair of serially connected substantially unobstructed vertical gas passes, the first of said gas passes positioned adjacent said furnace chamber and in communication with said furnace gas outlet, the lower portion of the tube and refractory wall of said gas-pass opposite said furnace chamber outlet inclined toward said primary furnace, a duct and valve system arranged for the introduction of air into said furnace chamber to maintain a furnace reducing atmosphere therein for the decomposition of inorganic chemicals and the partial combustion of the organic matter of said liquor, and a valved air conduit system arranged for a flow of air through said hollow floor and into the vertical gas pass to sweep the inclined lower portion of said gas-pass wall and to maintain the incombustible chemicals in gaseous suspension during flow therethrough.

2. Apparatus for the recovery of chemicals in a dry state and heat from residual liquor containing inorganic chemicals and organic combustible matter comprising, in combination, a horizontally elongated primary furnace chamber having a gas outlet at one end thereof, at least one burner arranged to spray said liquor substantially horizontally into the opposite end of said furnace chamber, a vapor generator, rows of vapor generating tubes and refractory material cooperating to define a pair of substantially unobstructed vertical gas-passes, the first of said vertical substantially open gas-passes positioned adjacent said primary furnace chamber and in communication with said furnace gas outlet and said other open gas-pass for serial flow of gases therethrough, a valved duct system arranged for the introduction of air into said primary furnace chamber to maintain a furnace reducing atmosphere for the relatively high temperature partial incineration of the organic matter of said liquor, means for introducing a portion of said primary furnace air at a position upwardly adjacent and arranged to sweep the floor of said furnace, and an associated valved air conduit system arranged for the introduction of air at spaced positions into the vertical gas-passes to complete the combustion of the organic matter and to stabilize the inorganic incombustible chemical constituents of said liquor, the cross-sectional area of said furnace and vertical gas-passes cooperating with the sequential introduction of air to maintain the incombustible chemicals in gaseous suspension during flow therethrough.

3. Apparatus for the recovery of chemicals in a dry state and heat from residual liquor containing inorganic chemicals and organic combustible matter comprising, in combination, refractory walls defining a horizontally elongated primary furnace chamber having a gas outlet at one end thereof, at least one burner arranged to spray said liquor into said furnace chamber, a vapor generator, rows of vapor generating tubes and refractory material cooperating to define a pair of substantially unobstructed vertical gas-passes, the first of said vertical substantially open gas-passes, positioned adjacent said furnace chamber and in communication with said furnace chamber gas outlet for serial flow of gases therethrough to the second gas-pass, the walls defining said first gas-pass having the vapor generating tubes covered with refractory material and the walls defining said serially connected gas-pass formed of bare tubes with refractory material filling the tube spaces therebetween, a duct and valve system arranged for the introduction of air into said furnace chamber to maintain a high temperature furnace reducing atmosphere therein, and an associated valved air conduit system arranged for the introduction of air into the vertical gas-pass furnace zone of said vapor generator to complete the combustion of the organic matter in said liquor under controlled temperature conditions, the cross-sectional area of said furnace and vertical gas-passes cooperating with the sequential introduction of air to maintain the incombustible chemicals in gaseous suspension during flow therethrough.

4. Apparatus for the recovery of chemicals in a dry state and heat from residual liquor containing magnesium sulphite and organic combustible matter comprising, in combination, refractory walls defining a horizontally elongated primary furnace chamber having a gas outlet at one end thereof, at least one burner arranged to spray said liquor substantially horizontally into the opposite end of said furnace chamber, a vapor geneator, rows of vapor generating tubes and refractory material cooperating to define a pair of substantially unobstructed vertical gas-passes, the first of said vertical substantially open gas-passes positioned adjacent said furnace chamber and in communication with said primary furnace gas outlet and in serial flow relationship with said other open gas-pass, an air heater arranged to heat combustion air by heat exchange with the heating gases leaving said vapor generator, a duct and valve system connected to said air heater for the introduction of preheated air into said primary furnace chamber to sweep the bottom thereof and to maintain a high temperature reducing atmosphere therein to cause the decomposition of the magnesium sulphite into magnesia and sulphur dioxide, and an associated valved air conduit system arranged for the introduction of preheated air into the lower and upper end portions of said first vertical gas-passes to complete the combustion of the organic matter of said liquor and to stabilize the magnesia and sulphur dioxide, the cross-sectional area of said primary furnace and vertical gas-passes cooperating with the sequential introduction of air to maintain the magnesia in gaseous suspension and in a dry condition during flow therethrough.

5. Apparatus for the recovery of chemicals in a dry state and heat from residual liquor containing inorganic chemicals and organic combustible matter comprising, in combination, refractory walls defining a primary furnace, a vertical bank of steam generating tubes laterally spaced therefrom, means forming a plurality of parallel serially connected vertical gas-passes connecting said primary furnace and tube bank including horizontally spaced rows of upright steam generating tubes and refractory material defining vertical gas-pass walls, the row of said tubes adjoining said furnace cooperating with the horizontally spaced second row of tubes to form opposite walls of a first unobstructed upflow gas-pass having its lower end opening to said primary furnace, a third row of said tubes horizontally spaced from said second row of tubes and cooperating therewith to form the opposite walls of an unobstructed downflow gas-pass having its upper end opening to the upper end of said first upflow pass, a fourth row of said tubes horizontally spaced from said third row of tubes and cooperating therewith to form the opposite walls of a second upflow gas-pass having its lower end opening to the lower end of said downflow pass and its upper end opening to the space containing said tube bank, a bank of steam superheating tubes positioned in the upper part of said second upflow gas-pass, and burner means arranged to discharge combustion air and residual liquor substantially horizontally into said primary furnace.

6. Apparatus according to claim 5, wherein the rows of tubes forming the opposite walls of said first unobstructed upflow gas-pass are covered on their gas-pass side by refractory material, and the rows of tubes forming the opposite walls of said downflow gas-pass and said second upflow gas-pass are bare on said gas-pass sides with refractory material filling the intertube spaces.

LESLIE S. WILCOXSON.

REFERENCES CITED

The following references are of record in the file of this patent:

UNITED STATES PATENTS

| Number | Name | Date |
|---|---|---|
| 418,274 | Cloudman | Dec. 31, 1889 |
| 1,137,780 | Moore | May 4, 1915 |
| 2,161,110 | Tomlinson | June 6, 1939 |
| 2,179,456 | Tomlinson | Nov. 7, 1939 |
| 2,198,446 | Wilcoxson | Apr. 23, 1940 |
| 2,262,420 | Badenhausen | Mar. 11, 1941 |
| 2,277,946 | Badenhausen | Mar. 31, 1942 |
| 2,416,462 | Wilcoxson | Feb. 25, 1947 |